(12) United States Patent
Xu

(10) Patent No.: US 10,768,098 B2
(45) Date of Patent: Sep. 8, 2020

(54) SPECTRUM RECOVERY IN A SAMPLE

(71) Applicant: DATACOLOR INC., Lawrenceville, NJ (US)

(72) Inventor: Zhiling Xu, Princeton Junction, NJ (US)

(73) Assignee: DATACOLOR INC., Lawrenceville, NJ (US)

( * ) Notice: Subject to any disclaimer, the term of this patent is extended or adjusted under 35 U.S.C. 154(b) by 0 days.

(21) Appl. No.: 16/428,490

(22) Filed: May 31, 2019

(65) Prior Publication Data

US 2019/0391071 A1    Dec. 26, 2019

Related U.S. Application Data

(60) Provisional application No. 62/690,203, filed on Jun. 26, 2018.

(51) Int. Cl.
*G01J 3/46*      (2006.01)
*G01N 21/27*      (2006.01)
*G01N 21/25*      (2006.01)

(52) U.S. Cl.
CPC ......... *G01N 21/274* (2013.01); *G01N 21/255* (2013.01)

(58) Field of Classification Search
CPC .... G01N 21/274; G01N 21/255; G01N 21/25; G01J 3/46; G01J 3/40
See application file for complete search history.

(56) References Cited

U.S. PATENT DOCUMENTS 5,844,680 A * 12/1998 Sperling ................... G01J 3/50
356/303

OTHER PUBLICATIONS

U.S. Appl. No. 15/934,044, filed Mar. 23, 2018, Ko Takeuchi.

* cited by examiner

*Primary Examiner* — Abdullahi Nur

(57) ABSTRACT

A method and a system are provided for obtaining improved spectra recovery results of a measurement of a sample through the use of a calibration matrix obtained from calibration measurement values using at least one illumination source. By calculating the reflectance spectrum of a collection of calibration samples across several rounds of measurements and cascading the results, an improved calibration matrix can be used to convert the sample measurement values to more accurate results.

19 Claims, 8 Drawing Sheets

SPECTRUM RECOVERY IN A SAMPLE

CROSS REFERENCE TO RELATED APPLICATION

The present application claims the benefit of U.S. patent application Ser. No. 62/690,203, filed Jun. 26, 2018, which is hereby incorporated by reference in its entirety.

FIELD OF THE INVENTION

The present invention is directed to apparatus, systems and methods for improving the recovery of transmissive or reflective properties of a sample.

BACKGROUND OF THE INVENTION

There is often a need to determine the transmissive or reflective properties of an object. The color of a sample can be determined by measuring its transmittance or reflectance properties at different wavelengths. For example, it is known to measure light that has been reflected from or transmitted through an object at wavelengths from 400 nm to 700 nm, typically at 10 nm intervals. However, to obtain accurate measurements of the spectrum of an object, a color sensor must have sufficient wavelength channels. Sensors with many wavelength channels (typically 31) produce highly accurate measurements but have cost and complexity drawbacks. Conversely, a sensor with few wavelength channels is cheaper and easier to produce, but such sensors have lower measurement fidelity and produce a less accurate measurement compared to sensors with higher wavelength channels. Specifically, the measurement values obtained by a color measurement device that has a low numbers of wavelength channels will be less accurate compared to the measurement values obtained by a color measurement device having a greater number of wavelength values.

For example, a 6-channel spectral sensor, such as the AS7262, produced by AMS USA of Cupertino, Calif. USA, can be used to measure reflectance spectra. However, such devices are not currently able to obtain a full spectrum of reflectances in the range of 400~700 nm with 10 nm intervals.

One mechanism to compensate for the lack of measurement fidelity is to use matrix transformation, such as described in commonly owned U.S. patent application Ser. No. 15/934,044, herein incorporated by reference in its entirety. As described therein, when using a low measurement fidelity measurement configuration, a series of known transmittance or reflectance color standards can be measured, and through the use of matrix transformation, a full transmittance or reflectance spectrum of the specimen can be recovered. However, using such matrix transformation can, at times, introduce measurement errors, noise or artifacts that yield a recovered spectrum having less than satisfactory results.

Thus, what is needed in the art is a system, method and computer implemented products that provide a color measurement system that includes noise reduction functionality and is less susceptible or sensitive to noise. In a further implementation, what is needed are approaches to maintaining or improving the stability of a color measurement system when using matrix-transformation approaches to recovering spectral information.

Furthermore, what is also needed is a solution to the problem introduced by using matrices to correct for inaccuracy of estimation of color values due to a low number of measurement channels.

SUMMARY OF THE INVENTION

In the disclosure provided herein, the apparatus, systems and methods describe recovering spectrum data from low-fidelity sensor configurations through the use of a calibration matrix generated by obtaining multiple measurements of a collection of calibration standards. The measurement matrix for each of the multiple measurements of the calibration standards are concatenated, thereby resulting in a calibration matrix that, when used in connection with measurement data of an object under analysis, enables the recovery of spectrum data for that object with greater precision and accuracy than would be possible using the low fidelity measurement device alone.

In a particular implementation, a color measurement apparatus is provided that includes one or more evaluative data models trained measurement values obtained by a low channel color measurement device from a collection of sample color sets. The trained model is configured to transform the measurement values into the values that are produced upon measurement of the same sample color sets by a color measurement device having greater wavelength channels. In one arrangement, a color sensor is used to obtain at least two measurements of a collection of sample color sets under the same illuminant or conditions. A reference color measurement device having a larger number of wavelength channels is used to measure the collection of color references. Using a subset of the measured reference colors, a transformation matrix is calculated to convert the measurement values for each color measurement set to match the measurement obtained from the reference color measurement device. This same calculated transformation matrix is then available to convert the measurements of the color sensor into spectral data.

In one or more implementations described herein, an apparatus is provided for obtaining a reflectance or transmittance spectra of a sample having color properties to evaluate. The measurement apparatus, in a non-limiting configuration, comprises at least one illuminant, wherein each of the at least one illuminants is configured to produce a light beam having a different spectral power distribution (SPD). The measurement apparatus also includes a color measurement device configured to generate an output signal in response to light being incident on the color measurement device, and a processor having a memory and configured to receive the output signal from the color measurement device and calculate a reflectance spectrum of the sample using at least i) the output signal generated when the sample is illuminated by the illuminant and ii) a transformation value or coefficient. In a further configuration, the transformation value is generated using a master calibration value and a sensor calibration value, wherein the sensor calibration value is a measurement matrix corresponding to at least two concatenated measurement matrices, where each measurement matrix corresponds to measurements of the same calibration standard under the same illuminant using the color measurement device.

In a further implementation, a method is provided that includes capturing, using a color sensing device, a first calibration measurement set corresponding to the measurement of one or more calibration standards under each of the at least one illuminants using the color measurement device.

A second calibration measurement set of the same one or more calibration standards is also captured under each of the at least one illuminants using the color measurement device. In further detail, a processor, having a memory and configured to execute code, is configured to calculate a transformation matrix value using the first and second calibration measurement set and a master calibration set.

In a further implementation, the master calibration set refers to the measurement matrix resulting from the measurement of the same one or more calibration standards by a reference color measurement device having at least as many color wavelength channels as the color measurement device.

In yet a further implementation, the transformation value is obtained by deriving the pseudoinverse of a matrix that includes the first and second measurement calibration multiplied by a matrix containing the master calibration measurement matrix value.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

By way of overview and introduction, various embodiments of the apparatus, systems and methods described herein are directed towards color measurement and analysis. The color of a specimen or sample can be determined by measuring its transmittance or reflectance properties at different wavelengths, for example, from 400 nm to 700 nm at 10 nm intervals. To make such measurements requires using a color measurement device (such as a multi-channel color sensor) with a sufficient number of wavelength channels. Color sensors, however, that have a high number of wavelength channels (such as 31 wavelength channels) can be costly. Color sensors that have fewer wavelength channels are more cost efficient, but the resulting color information obtained is generally less accurate. There are various approaches that use matrix transformations to provide estimates of information lost due to the limited scope of wavelength channels. Such approaches, however, can introduce noise or other artifacts into the measurement and calculation of spectra values that results in a recovered spectrum that is not wholly commensurate with the actual properties of a measurement specimen.

Averaging measurement values across a series of measurements of the same calibration standards and generating a transformation matrix based upon the values is one approach to improve the calibration or compensation values used in spectrum recovery. The present apparatus, systems and methods improve upon this approach by using multiple matrices to recover a more accurate representation of the spectrum from a sensor having only a few color channels. In doing so, the apparatus, systems and methods described herein, overcome and solve long standing problems in the technology in innovative and unconventional ways. In part, but in no way limiting, the apparatus, systems and methods provide improved spectrum accuracy and provide a mechanism for low color channel sensors to replicate the functionality provided by color measurement devices having a greater number of color channels.

For example, the apparatus, systems and methods described herein provide a measurement device that utilizes a transformation matrix or model that is built by concatenating at least two measurement matrices of the same calibration standards under the same illuminant(s). By concatenating the calibration measurement matrices, the color measurement device is able to recover spectrum data and produce measurement spectrum data regarding a sample under analysis that has greater measurement fidelity than the raw measurements obtained from a similar low wavelength channel device.

Figure 1A:
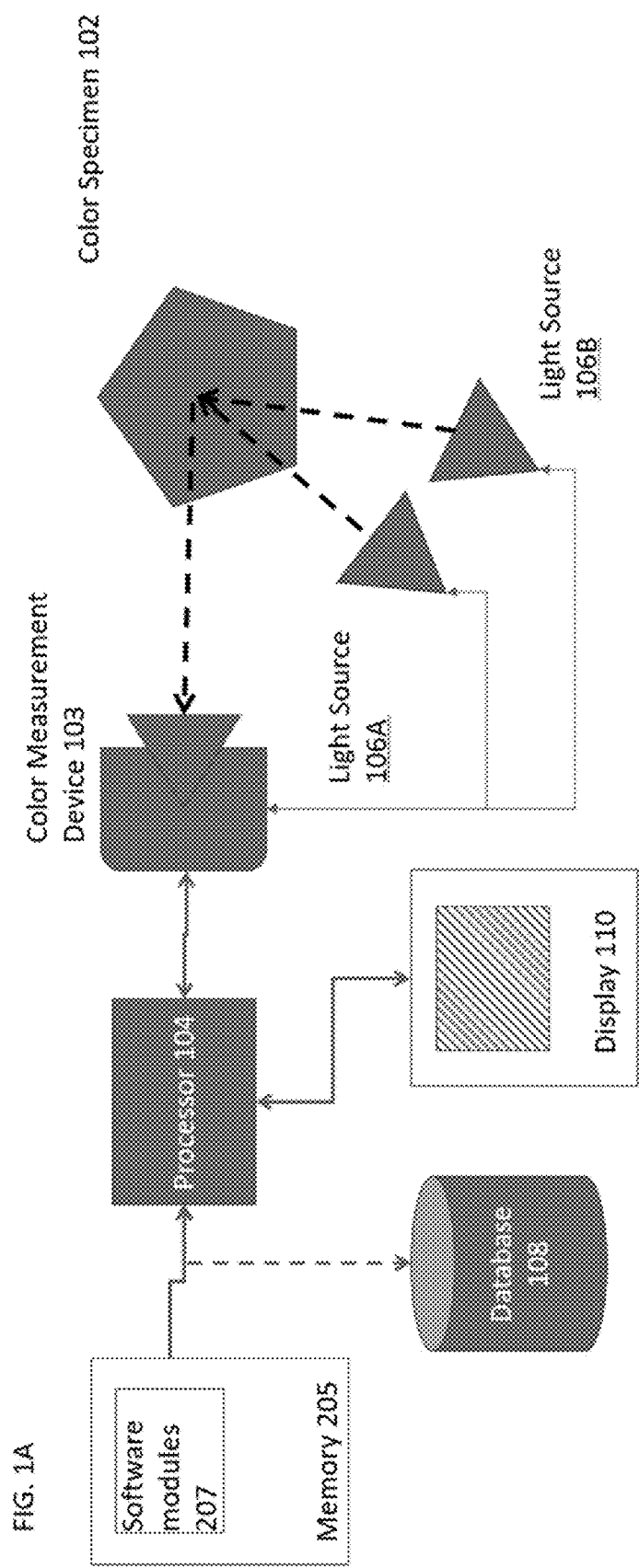
FIGS. 1A-1B illustrate devices and components that interface over one or more data communication networks in accordance with one or more implementations of the present application.

Referring now to the drawings, in which like references numerals refer to like elements, FIG. 1 illustrates devices and components for obtaining color measurement data that interface over one or more data communication networks in accordance with one or more implementations of the present application. As shown, FIG. 1A illustrates a color sample 102 under analysis by color measurement device or sensor 103. Here, the color sample 102 can be any type or form of physical article having color or spectral properties in need of analysis. In one implementation, the color sample 102 is sample of a material under production having reflective or transmissive properties. For instance, the color sample 102 is a fabric sample, such as fleece or fabric blends. In another implementation, the color sample 102 is a sheet of translucent or semi-translucent material. In yet a further implementation, the color sample 102 is an object or item integral to a larger structure or item, such as a dashboard of an automobile, or a section of wall of a structure. For example, the color sample 102 is a section or portion of stucco, carpe, building materials, housing, chassis, packaging, or another item.

With continued reference to FIG. 1A, the color sample 102 is placed such that the color sample 102 can be illuminated by at least one (1) illuminant.

In a further implementation, and for ease of explanation with the examples provided herein, the color sample 102 includes two (2) or more different illuminants. In one or more implementations, the illuminants 106A and 106B are commercially available lighting sources. For instance, the illuminants 106A-B, are separate devices that are configurable to produce a light with certain spectral power distributions. For instance, the light sources 106A-B are one or more discrete light emitting elements, such as LEDs, OLEDs, fluorescent, halogen, xenon, neon, D65 light, fluorescent lamp, mercury lamp, Metal Halide lamp, HPS lamp, incandescent lamp or other commonly known or understood lighting sources. In one arrangement, both light sources 106A and 106B are broad-band LEDs.

In one or more implementations, the illuminants 106A-B include a lens, filter, screen, enclosure, or other elements (not shown) that are utilized in combination with the light source of the illuminants 106A-B to direct a beam of illumination, at a given wavelength, to the sample 102.

In one implementation, the illuminants 106A-B are operable or configurable by an internal processor or other control circuit. Alternatively, the illuminants 106A-B are operable or configurable by a remote processor or control device having one or more linkages or connections to the illuminants 106A-B. As shown in FIG. 1A, the illuminants 106A-B are directly connected to a color measurement device 103.

As further shown in FIG. 1A, the illuminants 106A-B are positioned relative to the sample 102 and color measurement device 103 so as to provide a 45/0, d/8, or other illumination/pickup geometry combination. Where the sample 102 is a transmissive sample, however, the orientation of the illuminants 106A-B relative to the sample 102 and the color measurement device 103 is such that the light beam is directed though the sample 102 to the color measurement device 103.

Continuing with FIG. 1A, light incident (or in the case of a transmissive sample, transmitted) upon the sample 102 is captured or measured by a color measurement device 103. Here, the color sensing device can be a color sensor or image capture device. For example, the color measurement device 103 is a scientific CMOS (Complementary Metal Oxide Semiconductor), CCD (charge coupled device), colorimeter, spectrometer, spectrophotometer, photodiode array, or other light sensing device and any associated hardware, firmware and software necessary for the operation thereof. In a particular implementation, the color measurement device 103 is a 6-channel AMS spectral sensor, such as the AS7262 produced by AMS USA of Cupertino, Calif. USA.

In a particular implementation, the color measurement device 103 is configured to generate an output signal upon light being incident upon the color measurement device 103 or a light sensing portion thereof. By way of non-limiting example, the color measurement device 103 is configured to output a signal in response to light being incident upon a light sensor or other sensor element integral or associated with the color measurement device 103. For instance, the color measurement device 103 is configured to generate a digital or analog signal that corresponds to the wavelength or wavelengths of light that are incident upon a light sensor integral to the color measurement device 103. In one or more configurations, the color measurement device 103 is configured to output spectral information, RGB information, or another form of multi-wavelength data representative of light reflected off, or transmitted through, the sample 102.

In one or more implementations, the color measurement device 103 described herein, has less than 31 optical, NIR or other wavelength channels to evaluate a given wavelength range. In a further implementation, the color measurement device 103 has less than 15 wavelength channels to evaluate a given wavelength range. In a non-limiting example, the color measurement device 103 has six (6) wavelength channels to evaluate a given wavelength range.

In one non-limiting implementation, the color measurement device 103 is a camera or image recording device integrated into a smartphone, tablet, cell phone, or other portable computing apparatus. In a further embodiment, the color measurement device 103 is an "off the shelf" digital camera or web-camera connected or in communication with one or more computing devices.

The color measurement device 103, in accordance with one embodiment, is a stand-alone device capable of storing local data corresponding to measurements made of the sample 102 within an integrated or removable memory. In an alternative implementation, the color measurement device 103 is configured to transmit one or more measurements to a remote storage device or processing platform, such as processor 104. In configurations calling for remote storage of image data, the color measurement device 103 is equipped or configured with network interfaces or protocols usable to communicate over a network, such as the internet.

Alternatively, the color measurement device 103 is connected to one or more computers or processors, such as processor 104, using standard interfaces such as USB, FIREWIRE, Wi-Fi, Bluetooth, and other wired or wireless communication technologies suitable for the transmission measurement data.

The output signal generated by the color measurement device 103 is transmitted to one or more processor(s) 104 for evaluation as a function of one or more hardware or software modules. As used herein, the term "module" refers, generally, to one or more discrete components that contribute to the effectiveness of the presently described systems, methods and approaches. Modules can include software elements, including but not limited to functions, algorithms, classes and the like. In one arrangement, the software modules are stored as software 207 in the memory 205 of the processor 104. Modules also include hardware elements substantially as described below. In one implementation, the processor 104 is located within the same device as the color measurement device 103. However, in another implementation, the processor 104 is remote or separate from the color measurement device 103.

In one configuration, the processor 104 is configured through one or more software modules to generate, calculate, process, output or otherwise manipulate the output signal generated by the color measurement device 103.

In one implementation, the processor 104 is a commercially available computing device. For example, the processor 104 may be a collection of computers, servers, processors, cloud-based computing elements, micro-computing elements, computer-on-chip(s), home entertainment consoles, media players, set-top boxes, prototyping devices or "hobby" computing elements.

Furthermore, the processor 104 can comprise a single processor, multiple discrete processors, a multi-core processor, or other type of processor(s) known to those of skill in the art, depending on the particular embodiment. In a particular example, the processor 104 executes software code on the hardware of a custom or commercially available cellphone, smartphone, notebook, workstation or desktop computer configured to receive data or measurements captured by the color measurement device 103 either directly, or through a communication linkage.

The processor 104 is configured to execute a commercially available or custom operating system, e.g., MICROSOFT WINDOWS, APPLE OSX, UNIX or Linux based operating system in order to carry out instructions or code.

In one or more implementations, the color processor 104 is further configured to access various peripheral devices and network interfaces. For instance, the processor 104 is configured to communicate over the internet with one or more remote servers, computers, peripherals or other hardware using standard or custom communication protocols and settings (e.g., TCP/IP, etc.).

The processor 104 may include one or more memory storage devices (memories). The memory is a persistent or non-persistent storage device (such as an IC memory element) that is operative to store the operating system in addition to one or more software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 104 provides for the storage of application program and data files. One or more memories provide program code that the processor 104 reads and executes upon receipt of a start, or initiation signal.

The computer memories may also comprise secondary computer memory, such as magnetic or optical disk drives or flash memory, that provide long term storage of data in a manner similar to a persistent memory device. In one or more embodiments, the memory of the processor 104 provides for storage of an application program and data files when needed.

The processor 104 is configured to store data either locally in one or more memory devices. Alternatively, the processor 104 is configured to store data, such as measurement data or processing results, in a local or remotely accessible database 108. The physical structure of the database 108 may be embodied as solid-state memory (e.g., ROM), hard disk drive systems, RAID, disk arrays, storage area networks ("SAN"), network attached storage ("NAS") and/or any other suitable system for storing computer data. In addition, the database 108 may comprise caches, including database caches and/or web caches. Programmatically, the database 108 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 108 includes the necessary hardware and software to enable the processor 104 to retrieve and store data within the database 108.

In one implementation, each element provided in FIG. 1A is configured to communicate with one another through one or more direct connections, such as though a common bus. Alternatively, each element is configured to communicate with the others through network connections or interfaces, such as a local area network LAN or data cable connection. In an alternative implementation, the color measurement device 103, processor 104, and database 108 are each connected to a network, such as the internet, and are configured to communicate and exchange data using commonly known and understood communication protocols.

In a particular implementation, the processor 104 is a computer, workstation, thin client or portable computing device such as an Apple iPad/iPhone® or Android® device or other commercially available mobile electronic device configured to receive and output data to or from database 108 and or color measurement device 103.

In one arrangement, the processor 104 communicates with a display device 110 for displaying data. In one arrangement the display device 110 and processor 104 are incorporated into a single form factor, as in the case of a notebook computer, portable device and the like. In another configuration, the display device is a computer or processor remote from the processor 104 that enables the user to receive data. The display device 110 further includes one or more associated input devices and/or hardware (not shown) that allow a user to access information, and to send commands and/or instructions to the processor 104 and the color measurement device 103. In one or more implementations, the display device 110 is a screen, monitor, display, LED, LCD or OLED panel, augmented or virtual reality interface or an electronic ink-based display device.

Those possessing an ordinary level of skill in the requisite art will appreciate that additional features, such as power supplies, power sources, power management circuitry, control interfaces, relays, adaptors, and/or other elements used to supply power and interconnect electronic components and control activations are appreciated and understood to be incorporated.

Figure 2A:
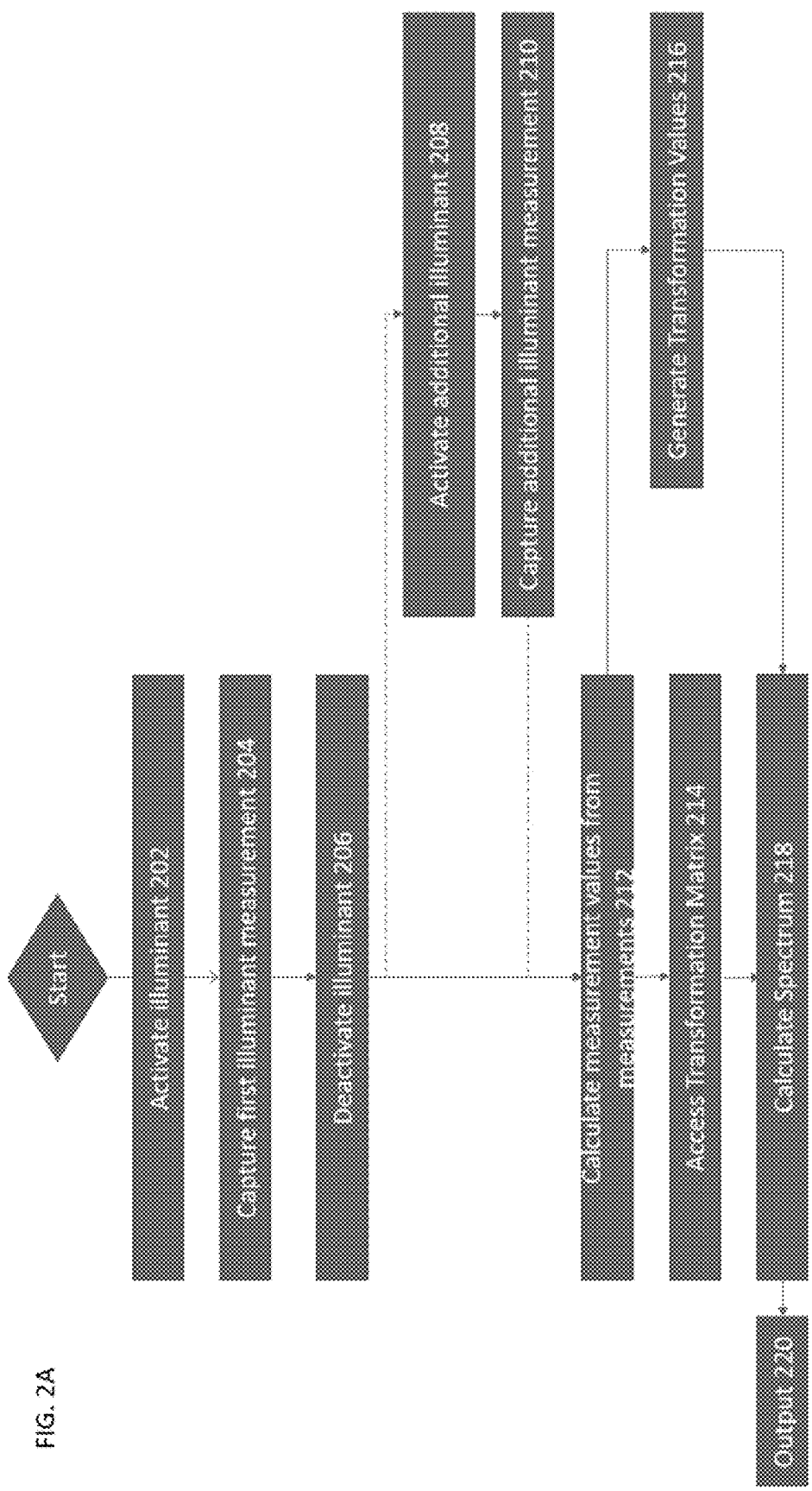
FIGS. 2A-2B present a flow diagram detailing the steps taken in one configuration of the color measurement system according to one embodiment of the present application.
Figure 3:
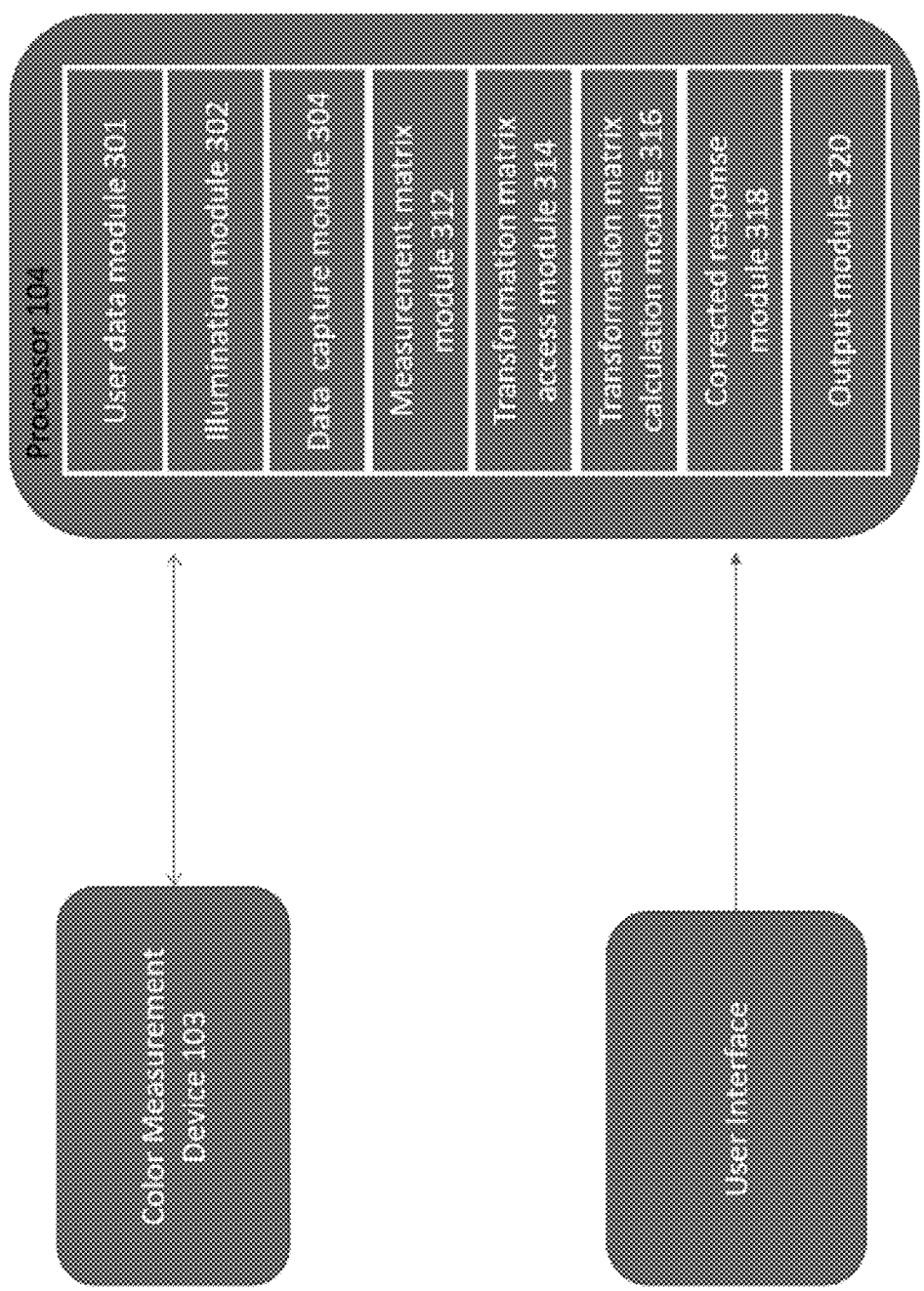
FIG. 3 presents a collection of modules detailing the operative functions of the color measurement system according to one configuration of the present invention.

Turning now to the overview of the operation of the system described in FIGS. 2A and 3, the processor 104 is configured to implement or evaluate the output of the color measurement device 103. With particular reference to FIG. 2A, in order to acquire measurements of the sample 102 under one or more (such as two) illuminants, a color measurement of the sample 102 is made under a first illuminant as shown in step 202. Here, one or more control signals, sent in one particular implementation by the processor 104 or color measurement device, causes one of the illuminants 106A-B to activate, thereby sending light of a given SPD to the sample 102. In a particular configuration, one or more illumination modules 302, configured as code executing within the processor 104 configure the processor 104 to activate the desired illuminant. In one or more configurations, the illuminants 106A-B is a broad-band light source, or a light source that includes multiple sub-lighting elements, each capable of emitting a light with a given SPD. Here, one or more submodules of the illuminant module 302 configures the processor 104 to select the desired wavelength or light source available to the illuminants 106A-B.

As shown with reference to FIG. 3, in one implementation, the user data module 301 is configured to receive, from one or more input devices, the user's desired selection, operational parameters, control flags, data or other information. For example, the user data module 301 is configured to receive data from the display device 110 that has been input by the user. This data can, in one implementation, include a desired process, procedure or parameters to implement. The user data module 301 includes hardware and/or software that configures the processor 104 to receive and interpret user supplied data.

In response to user data that signals the start of a data capture session, the illumination module 302 configures the processor 104 to activate one or more illuminants. In one arrangement, the illumination module 302 can include hardware and/or software that allows the processor 104 to receive instructions for operating the one or more illuminants. The illumination module 302 configures the processor 104 to receive and interpret user input sent by way of the user data module 301. As shown with reference to FIG. 3, in one implementation, the illuminant module 302 is configured to select the illuminant based on user input. The illumination module 302 includes hardware and/or software that configures the processor 104 to provide a control signal to one or more illuminants. The illumination module 302 further can include hardware and/or software that allows the processor 104 to receive instructions for operating the one or more illuminants. For instance, the illumination module 302 configures the processor 104 to receive and interpret user input sent by way of the user data module 301. For example, upon receiving user input regarding the type, nature or category of sample, the illumination module 302 configures the processor 104 to automatically select two or more illuminants from the available illuminants to illuminate the sample 102 based on internal rules, algorithms or lookup tables that correlate sample type to illuminant type or selection.

Upon illumination by the first illuminant, the light returned from the sample 102 is directed to the color measurement device 103. In response to light incident upon the color measurement device 103, a signal or output is generated that includes information about the sample 102 under analysis. The output or signal is received by the processor 104 as in step 204.

Here, a measurement data capture module 304 configures a processor 104 to capture or record the output of the color measurement device 103. Data capture module 304 includes hardware and/or software that configure the processor 104 to obtain, store, secure or make available data. In one implementation, the output captured by the processor 104 configured by a measurement data capture module 304 is composed of a pixel data array, analog signal (or signals), digital data stream, data file, serial encoding, binary data, or other information suitable to contain information about the light that has been incident upon the sample 102 and received by the color measuring device 103.

In a further implementation, one or more submodules of the measurement data capture module 304 configures the processor 104 to convert, format or otherwise condition the data received from the color measurement device 103. For example, a submodule of the measurement data capture module 304 converts the data from a raw binary data to a digital file.

In a particular implementation, the data captured by the color measurement device 103 is stored within a memory of the processor 104. Alternatively, the data relating to the measurements made of the sample 102 under any of the illuminants 106A-B are stored on a remote database 108 for later retrieval or processing. In yet a further implementation, data regarding the specific make, model, brand, and settings of the color measurement device 103 are stored along with the measurement data.

In a further implementation, the characteristics of the illuminants 106A-B are also stored along with the measurement data. For instance, the processor 104 is configured to activate the illuminants 106A-B in order to record measurement data output by the color measurement device 103 and access the properties of the illuminant 106A-B used. One or more submodules of the data capture module 304 configure the processor 104 to access data regarding the activated illuminant from a look up table or database of illuminants 106A-B. Through one or more additional submodules of the data capture module 304, the processor 104 is configured to associate the characteristics of the specified illuminant 106A-B with the relevant measurement data.

As shown in step 206, the processor 104 is configured by one or more submodules of the illumination module 302 to deactivate an illuminant. As noted, the described apparatus, system and methods are operable with a single illuminant. As such, from step 206, the processor can proceed directly to step 212. However, in alternative configurations where multiple illuminants are used, the processor 104 is also configured by one or more submodules of the illumination module 302 to activate an additional illuminant as shown with respect to the dashed lines pointing to step 208. Here, the processor 104 is configured by one or more modules cooperating with one another to determine the appropriate or desired illuminants 106A-B. For example, the user input stored or accessible by the user data module 301, configures the processor 104 to select a given illuminants 106A-B based on the type of material under analysis.

Once the first measurement(s) under the first illuminant have been made and the illuminant is deactivated, a second illuminant is activated as in step 208. For instance, upon receiving a ready or available flag from the color measurement device, the processor 104 is configured by the illuminant module 302 (or a submodule thereof) to activate the second illuminant as shown in step 208.

The processor 104 is configured to receive the output of the color measurement device 103 generated upon light that has been incident upon the sample 102. Upon illumination of the sample 102 under the second illuminant, the processor 104 is configured by the data capture module 304 to obtain the output of the color measurement device 103 using the second illuminant, as shown in step 210.

In one or more particular implementations, further illuminants are used to capture additional data relating to the sample 102 under different wavelengths. In this arrangement, the processor 104 is configured to return to step 206 and proceed to step 210. For instance, where the user data module 301 configures the processor 104 to capture measurement data under each illuminants 106A-B available to the system or apparatus so described, the processor 104 iterates through steps 206-210 until each illuminants 106A-B has illuminated the sample 102 and corresponding data has been captured and/or stored in the local or remote memory 205.

Using the measurement data obtained under at least the first illuminant (directly from step 206, or by way of additional steps 208-210), a value or data set for the measured (reflectance or transmittance) values of the sample 102 are generated as shown in step 212. For example, the processor 104 is configured by a measurement matrix module 312 to access the stored values relating to the measurements obtained under one or more illuminants. Measurement matrix module 312 includes hardware and/or software that configures the processor 104 with the necessary operational parameters to generate and/or calculate matrices or other mathematical constructs. Measurement matrix module 312 further configures the processor 104 to access and/or store one or matrices. The stored values are used to calculate a measurement matrix for corresponding to the sample. For example, and in no way limiting, the present system is configured to generate measurement matrix T of the sample measured. By way of example, the measurement matrix T for a sensor 104 having six (6) wavelength channels illuminated by two illuminants is provided as:

$$T = \begin{pmatrix} s_{1,1} & \cdots & s_{1,12} \\ \vdots & \ddots & \vdots \\ s_{t,1} & \cdots & s_{t,12} \end{pmatrix}, \quad (1)$$

where $s_{t,p}$ is the sensor reading of sample t at channel p. Where there is only one sample, T has a single row.

Such a measurement matrix T then used to generate a recovered spectrum $R_{convert}$ using a transformation matrix M according to:

$$R_{convert} = \begin{pmatrix} v_{1,1} & \cdots & v_{1,31} \\ \vdots & \ddots & \vdots \\ v_{t,1} & \cdots & v_{t,31} \end{pmatrix} = T*M, \quad (2)$$

Where $v_{t,n}$ is the recovered reflectance of sample t at wavelength n.

In a particular implementation, the system described accesses the transformation matrix M from a storage device or database 108. Transformation matrix access module 314 includes hardware and/or software that configures the processor to navigate a file structure, copy, or otherwise obtain access to a transformation matrix that was generated in step 212. For instance, the transformation matrix access module 314 configures the processor 104 to access a pre-derived value for M stored in one or more data storage devices for use in further calculations by the processor 104. As shown in step 214, the processor 104, configured by transformation matrix access module 314 accesses one or more data storage locations containing a reference to, or actual value(s) of M.

Figure 1B:
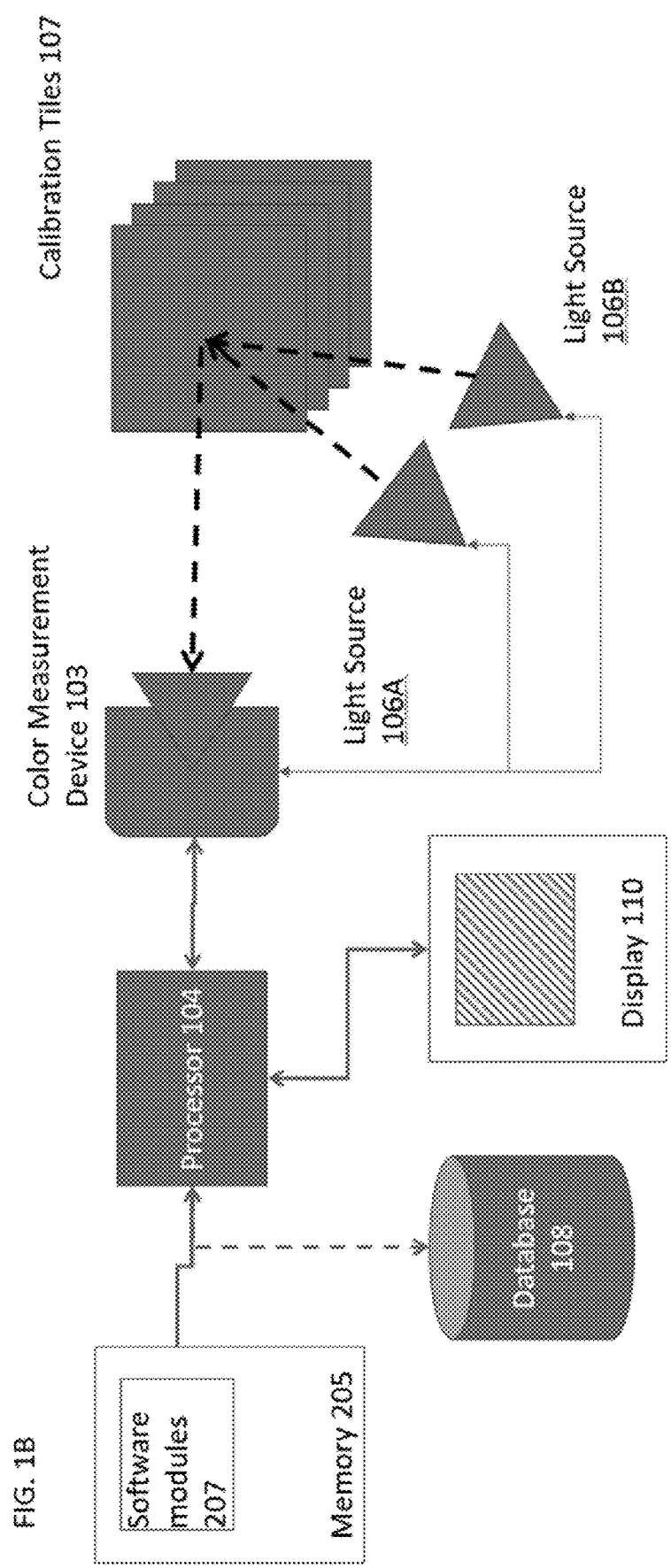

In one configuration, shown in the arrangement of elements provided in FIG. 1B, the transformation matrix M is generated from one or more measurements made from calibration standards. For example, as shown in step 216, the processor 104 configured by a transformation matrix calculation module 316 to calculate the transformation matrix value. In one arrangement, the matrix value, referred here as M0 can be calculated according to:

$$M0 = \text{pinv}(S)*R \qquad (3)$$

In equation 3, M0 is the product of the pseudoinverse of S, where, S is a measurement matrix of a plurality of calibration standards obtained using the color measurement device 103 and R, where R is a measurement matrix of the same calibration standards obtained using a master measurement device.

As provided in further detail herein, M0 can be generalized to M, where M represents product of the pseudoinverse of S, where S is a concatenation of measurement matrices each obtained under the same measurement condition of the same color calibration standards, and R, represents where R represents a concatenation of measurement matrices of the same calibration standards obtained using a master measurement device.

In one particular configuration, the value for S is derived from measurements made from the same, or substantially similar, make, model or type of sensor incorporated into the color measurement device 103. In a further implementation the values for S are obtained using the same illuminants as used to capture the sample measurements using the color measurement device 103. In one particular implementation, a master measurement device is a color measurement device having sufficient wavelength channels to provide complete response spectrum for the calibration targets. In one configuration, the master measurement device has a greater number of wavelength channels than the color measurement device 103. In a further configuration, the master measurement device is a Datacolor 800 spectrophotometer, manufactured by Datacolor Inc. of Lawrenceville, N.J., USA.

In one particular implementation, a submodule of the transformation matrix calculation module 316 accesses the values for S and R from a database or data storage element and calculates M according to equation (3). Transformation matrix module 316 includes hardware and/or software that configures the processor 104 to communicate with a database, initiate a data retrieval procedure and process the resulting data. For example, the transformation matrix module 316, or a submodule thereof, configures a processor 104 to access a dataset, value, or object representing S and R from a database 108 or other data storage device.

In a further implementation, only the value for R is accessed from a remote storage device. In this configuration, the value for S is derived from measurements made using the color measurement device under at least a single illuminant.

In a further implementation, the value for R is also derived using a master calibration device.

In one particular implementation, the value for R is obtained by measuring the reflectance of one or more calibration standards using a master calibration device. For instance, using the master calibration device, a master calibration matrix can be derived or calculated according to:

$$R = \begin{pmatrix} r_{1,1} & \cdots & r_{1,31} \\ \vdots & \ddots & \vdots \\ r_{12,1} & \cdots & r_{12,31} \end{pmatrix}, \qquad (4)$$

Here, R is the master device reflectance matrix, and $r_{m,n}$ is the reflectance of tile m at wavelength n.

Figure 2B:
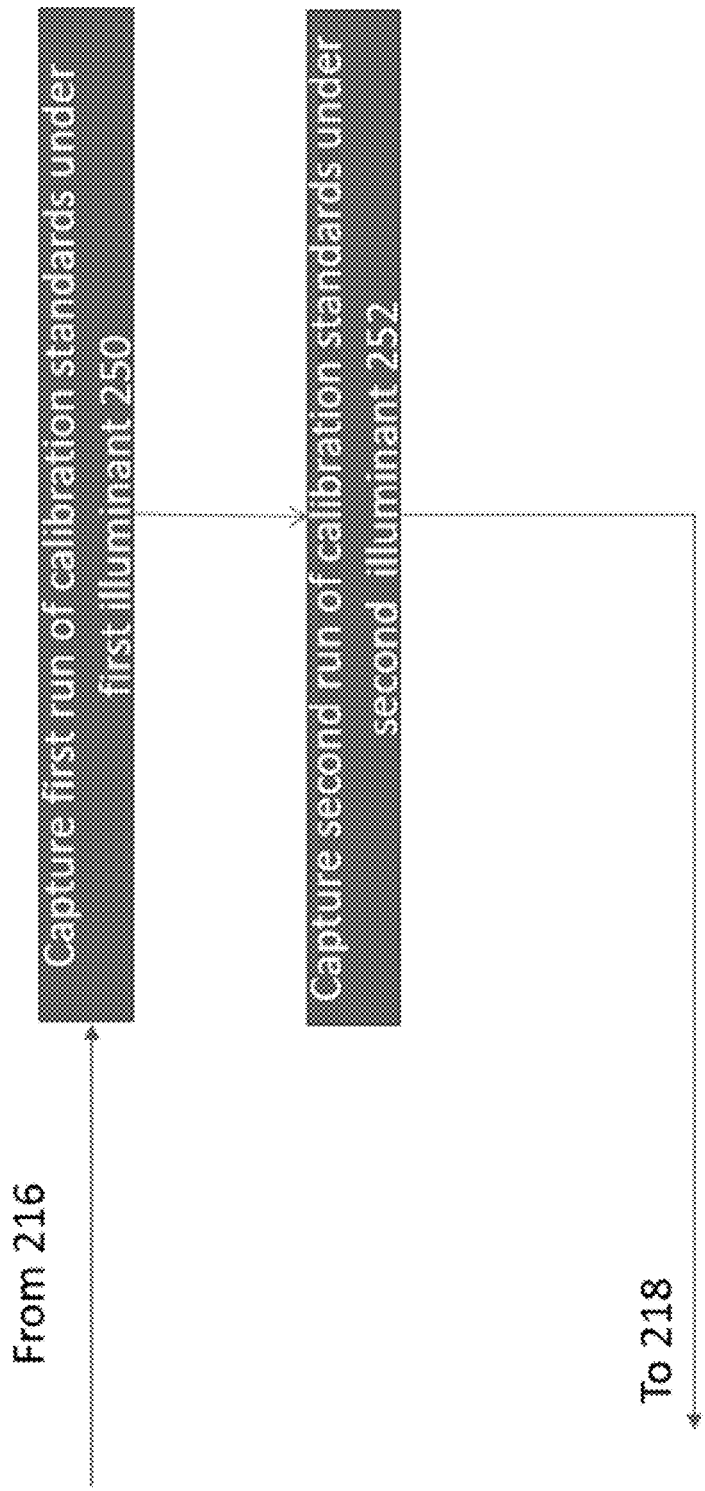

Turning to FIG. 2B, depending on configuration, user selection or other factors, the processor 104 is configured by the transformation matrix calculation module 316 to generate either or both of the master calibration matrix (R) and measurement calibration matrix (S). For ease of explanation, the flow diagram of FIG. 2B provides a series of steps for generating the measurement calibration matrix (S) using the color measurement configuration described herein. However, those possessing an ordinary level of skill in the requisite art will appreciate that additional or alternative configuration or steps are envisioned.

As shown in FIG. 1B, and step 250 of FIG. 2B, using the illuminants 106A-B, a collection of color tiles or calibration standard 107 having known reflectance values are measured using the color measurement device 103. However, as noted, only a single illuminant 106A or 106 B need be used to generate the measurement calibration matrix. In one instance, the color calibration standards 107 are BCRA ceramic tiles manufactured by Ceram Technology Ltd. By way of non-limiting implementation, the first series of measurements includes obtaining the sensor response from the color measurement device 103 of 12 color calibration standards under at least one (1) illuminant. In one particular configuration, the color calibration targets 107 include tiles or reference elements depicting three (3) neutral greys colors for checking photometric linearity, seven (7) chromatic colors for checking spectral response, one (1) difference grey and one (1) difference green. It will be appreciated that the so-called difference tiles are used to assess repeatability. Those possessing an ordinary level of skill in the requisite art will appreciate that other make and models of calibration standards are also contemplated and envisioned.

By way of continued example, when measured by a sensor having six (6) wavelength channels using two illuminants, the 12-channel sensor result of each of the calibration tiles 107 (the calibration measurement) can be described as follows:

$$S = \begin{pmatrix} s_{1,1} & \cdots & s_{1,12} \\ \vdots & \ddots & \vdots \\ s_{12,1} & \cdots & s_{12,12} \end{pmatrix}, \qquad (5)$$

Using the generated values for S and R the value for transformation matrix M0 can be generated by a processor 104 suitably configured by a transformation matrix generation module 316 according to equation 3.

Figure 4:
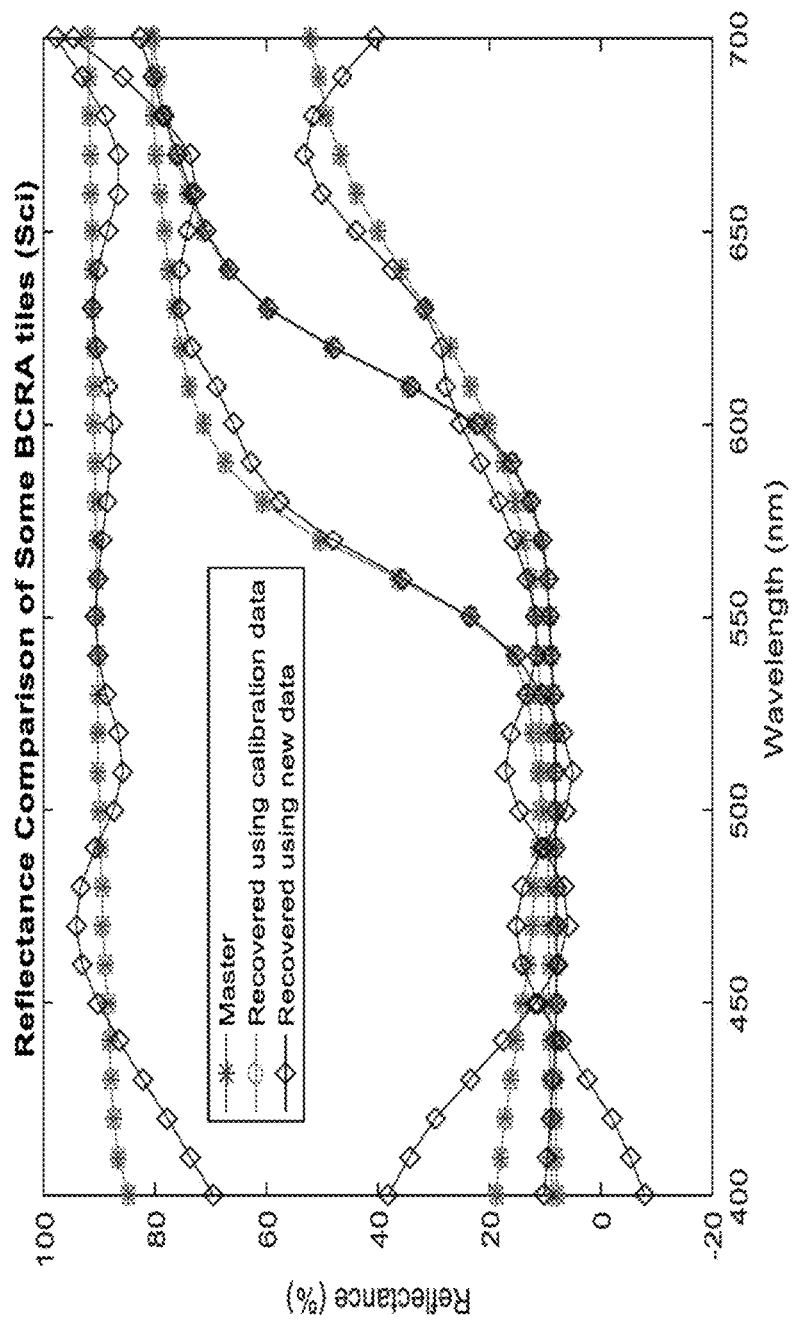
FIG. 4 is a graph detailing the reflectance comparison of one configuration of the calibration device.

However, as shown with respect to FIG. 4, because each measurement of the calibration standards is not the same, the eventual recovered spectrum is, at times, not stable. For example, when an attempt is made to recover the reflectances of the same BCRA tiles from a new round of measurement, the result has much larger error than the recovered result using the original calibration measurement (only 4 different tiles were shown). With continued reference to FIG. 4, the star lines (red) show the master reflectances of several BCRA tiles measured with the master calibration device, the circle lines (green) show the recovered reflectances of the same BCRA tiles using the sensor data (S) as calibration data, and the diamond lines (blue) show the recovered reflectances of the same BCRA tiles using the new sensor data. Thus, while reflectance can be recovered using the calibration data, a new measurement will result in larger error.

Thus, to provide an improved reflectance recovery, the system and method described herein provide at least two rounds of calibration measurements using the 103 measurement device and the calibration targets 107.

For instance, turning back to FIG. 2B, once each color calibration standard has been measured according to step 250 under at least a first illuminant (106A or 106B), the measurement step is repeated, as shown in step 252. For example, the same calibration standards (e.g. 12 calibration tiles) are measured again as a second run measurement.

Using the first and second run of measurements of the same calibration tile, the processor 104 configured by a submodule of the transformation matrix module 316 generates a new sensor response matrix:

$$S2 = \begin{pmatrix} s_{1,1} & \cdots & s_{1,12} \\ \vdots & \ddots & \vdots \\ s_{12,1} & \cdots & s_{12,12} \\ x_{1,1} & \cdots & x_{1,12} \\ \vdots & \ddots & \vdots \\ x_{12,1} & \cdots & x_{12,12} \end{pmatrix} \quad (6)$$

where S2 is the sensor response matrix, where $s_{m,p}$ is the sensor reading of tile m at channel p in the first run of measurement, and $x_{m,p}$ is the sensor reading of tile m at channel p in the second run of measurement. Here the two concatenated matrices correspond to the first and second measurement runs of the calibration tiles. Here, two illuminants were used to capture the first measurement matrix $s_{m,p}$. So long as the same conditions used to capture $s_{m,p}$ are replicated in $x_{m,p}$, (i.e. the illuminant(s) used to capture $x_{m,p}$, and number of reference tiles are the same) then the two matrices are concatenated. For ease of continued explanation, in an alternative configuration, the concentrated measurement matrix according to the forgoing can be provided as:

$$S2 = \begin{pmatrix} SBCRA1 \\ SBCRA2 \end{pmatrix}$$

where SBCRA1 is the sensor response matrix of the first measurement run of the calibration tiles and SBCRA2 is the sensor response matrix of the second measurement run of the calibration tiles. Here, S2 represents a concatenation of the measurement matrices and not an averaging of the matrices.

Like the calibration measurements obtained using the measurement device 103, the measurement of the calibration references obtained using the master calibration device can be rerun for a second measurement set. The results of this second, or any additional measurement run are concatenated with the first and subsequent measurement runs. Alternatively, a measurement matrix of the master calibration measurements is generated according to:

$$R2 = \begin{pmatrix} R \\ R \end{pmatrix} \quad (7)$$

Once both R2 and S2 have been calculated, the processor 104 is configured by the transformation matrix module 316 to generate a transformation matrix M using the derived values for R2 and S2. For example, the transformation matrix M is derived according to:

$$M = pinv\begin{pmatrix} SBCRA1 \\ SBCRA2 \end{pmatrix} * \begin{pmatrix} R \\ R \end{pmatrix} \quad (8)$$

Wherein pinv is the pseudoinverse operation of a matrix. Once the value for M has been generated according to step 216, the corrected response matrix is calculated according to step 218. For example, the processor 104 is configured by a corrected response matrix module 318 to use the transformation matrix M to recover the full spectrum, according to equation 2, made of a given sample made according to steps 202-210. The corrected response matrix module includes hardware and/or software that configures the processor 104 to implement execute code or functions that are used to generate the corrected response values using the transformation matrix.

In a further implementation, $$M = pinv\begin{pmatrix} SBCRA1 \\ SBCRA2 \\ \cdots \\ SBCRAn \end{pmatrix} * \begin{pmatrix} R \\ R \\ \cdots \\ R \end{pmatrix},$$

where SBCRAn represents the Nth measurement run of the one or more calibration standards obtained using the color measurement device. In this configuration, the concatenated matrices R are each a replication of a single measurement matrix.

In an alternative configuration the transformation matrix M is obtained according to the flowing:

$$M = \left( pinv\begin{pmatrix} SBCRA1 \\ \cdots \\ SBCRAn \end{pmatrix} * \begin{pmatrix} R_1 \\ \cdots \\ R_n \end{pmatrix} \right)$$

where, SBCRA1-SBCRAn each corresponds to a calibration matrix of measurements made of a plurality of calibration standards under the same at least one measurement criterion. As shown in the above equation, $R_1$-$R_n$ corresponds different master calibration matrices. Here, each of the master calibration matrices are obtained from the same plurality of calibration standards using the same master measurement device under the same measurement conditions. In this arrangement, each R ($R_1$-$R_n$) represents a different measurement run using the master measurement device, and not a replication of a single run.

Once the calibration matrix M (12×31) is computed by Eq. (8), it can be used to transform any row 12-vector s of sensor values to a row 31-vector r that comprises a reflectance-spectrum estimate:

$$r = s * M. \qquad (9)$$

where s is a matrix having a single row and each column is a different wavelength channel. Once the reflectance spectrum has been generated, the processor 104 is configured by an output module 320 to store the generated reflectance spectrum to a local or remote database, and/or to generate on a display 110 the reflectance spectrum, as in step 220. In an alternative configuration, equation 9 can be rewritten as:

$$r = s * \left( pinv \begin{pmatrix} SBCRA1 \\ SBCRA2 \\ \ldots \\ SBCRAn \end{pmatrix} * \begin{pmatrix} R \\ R \\ \ldots \\ R \end{pmatrix} \right) \qquad (10)$$

Figure 5:
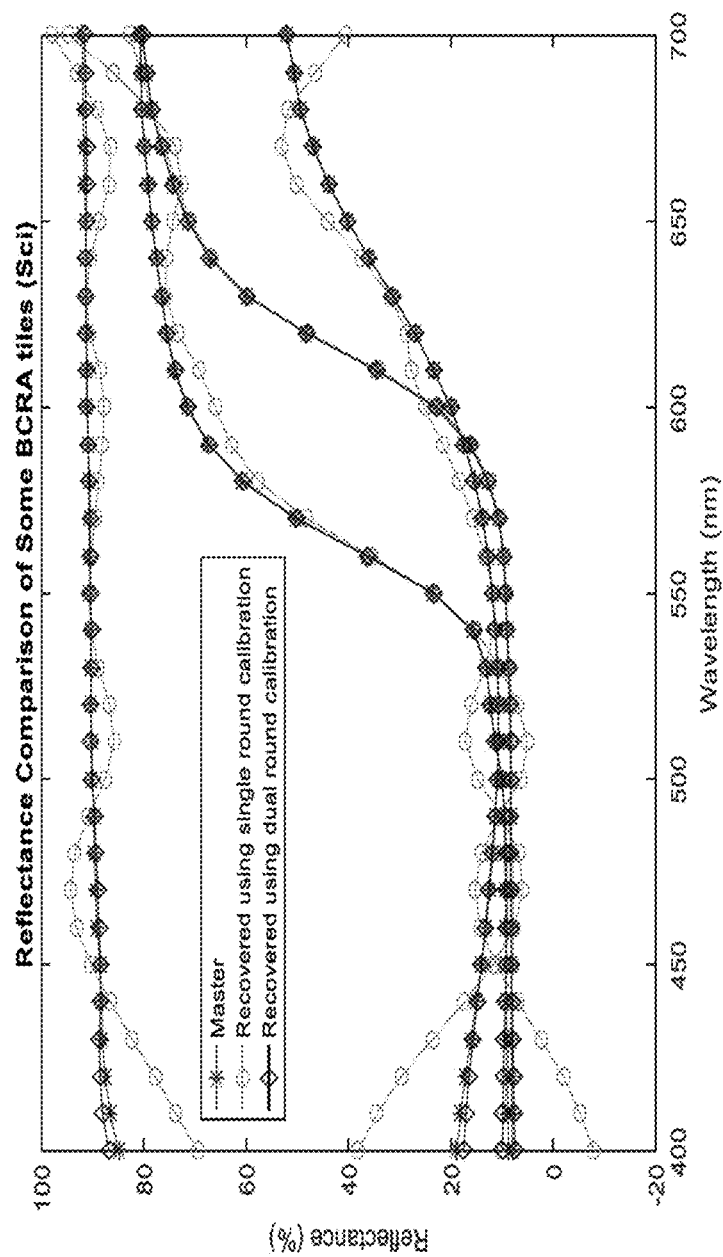
FIG. 5 is a graph detailing the reflectance comparison of one configuration of the calibration device.

As shown in FIG. 5, while the single round of calibration is unstable, at least a dual round calibration, where the matrices of both rounds are concatenated, can correct for noise and recover the reflectance of the calibration tiles. Thus, as a whole, the entire system described produces an improved technological result relative to the prior methods. As such, using the foregoing systems and processes, sensors having fewer wavelength channels can be used in circumstances and scenarios where stable spectrum recovery is desired or necessary. Such improvements in the technological field permits improved spectrum measurements without an attendant increase in the complexity or expense of the sensor platform. Furthermore, while only two rounds of calibration measurement are described herein, those possessing an ordinary level of skill in the requisite art will appreciate that the combination of any number of rounds of calibration measurement and any number of either the same or different round of master reflectance matrix is contemplated and understood.

Without being held to any particular theory or scheme of operation, the results of the measurements made the multiple rounds of measurements (e.g. S2) provides an improved result over prior methods. For example, the described approach provided improved results over standard methods of obtaining S, such as $S_{BCRA} = (S_{BCRA1} + S_{BCRA2})/2$. Without further limit to the approach, it is possible that simple averaging methods add cross terms of noise rendering the recovered response unstable. In contrast, the approach described herein for concatenating the recovered responses removes or corrects for these noise cross terms.

As noted, the present systems, methods and apparatus, described herein provide an improvement over the art of color measurement. According to the features and disclosures provided, a color sensor, when used in combination with multiple light sources, can achieve a measurement result that improves upon the results achievable with a measurement device having a limited the number of wavelength channels. Furthermore, by using multiple rounds of both master calibration measurement data and device calibration measurement data, the amount of noise in the recovered reflectance spectrum is reduced and the stability of the measurements are improved.

By way of further example, the presently described approach can be compared to alternative approaches for obtaining recovered spectrum information. For example, the advantage of the dual matrix approach described herein can be quantified relative to other approaches to recover spectrum data.

By way of example, the hardware arrangement provided in the described embodiments was used to evaluate a collection of color samples using a color sensor under two different illuminants. For instance, in one arrangement, a 16-channel color measurement system (8-channel color sensor with two broad-band LEDs) is used to measure a 12-color ceramic tile set and a 30-color ceramic tiles set, for a total of 42 colors measured. In one particular implementation, each of the colors of the 42 colors are measured twice (referred to here as measurement or M 1 and measurement or M2). The same 42 tiles were also measured with a reference instrument (such as a 245 instrument).

In a particular implementation, the 16-channel system described herein is trained with a sub-set of the total reference color measurement set. For example, a sub-set of the calibration colors (e.g. N=30 from the 42 tiles) can be used to train the described system to recover spectrum of a sample. In fact, more than one particular approach can be used to obtain train the system to recover the spectrum of a sample.

In one implementation, a first approach (Approach 1) uses measurement 1 (called raw1) values from the N color set to calculate a transformation matrix (Matrix1). The transformation matrix when calculated, is able to convert the values for raw1 towards the measurement values obtained for the same sub set of N values but obtained by the reference instrument result (such values are herein referred to as 'ref'). The same transformation matrix (Matrix1) is then used to convert raw1 and raw2 into spectra data.

Figure 6:
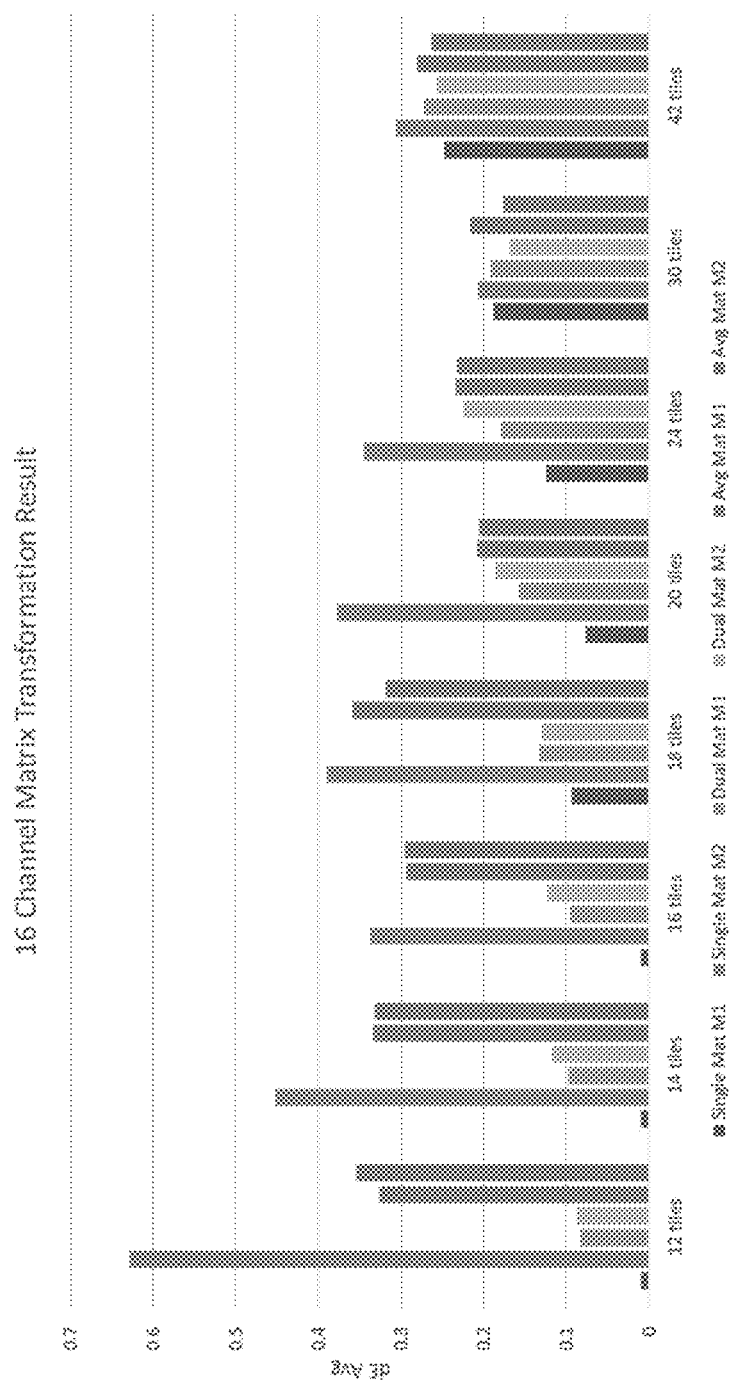
FIG. 6 is a graph detailing the comparison of multiple approaches to spectrum recovery.

Here, the converted spectra data can be compared to the reference value (ref) in order to calculate color difference dE(CIELAB), as shown in FIG. 6).

In an alternative approach (Approach 2) that implements the approach described in the herein, the measurement values for raw1 and raw2 are used to calculate a dual transformation matrix (Matrix2). The generated dual transformation matrix is able to covert raw1 and raw2 towards reference instrument result (ref). Once an appropriate dual transformation matrix is generated, the dual transformation matrix (Matrix2) is used to convert raw1 and raw2 into spectra data.

Here, the converted spectra data is compared to the reference value (ref) to calculate color difference dE(CIELAB), as further shown in FIG. 6.

In yet another approach (Approach 3), an average of raw1 and raw2 is obtained. A transformation matrix (Matrix3) is generated that converts average raw data towards ref. The M3 matrix is used to convert raw1 and raw2 into spectra data.

Here, the converted spectra data is compared to the reference value (ref) to calculate color difference dE(CIELAB), as shown in FIG. 6.

With continued reference to the chart of FIG. 6, different N values were used to evaluate the three described approaches. The result provides eight (8) groups of bars corresponding to eight (8) different number for N (e.g. N=X axis) used for calculation. In each group, six (6) bars are shown. The first two bars are the average dE of all the calibration colors after converted to spectra using Matrix1 and compared to the reference spectra ref, M1 is for measurement 1 and M2 is for measurement 2. The middle two bars are average dE of all the calibration colors after converted to spectra using Matrix2. The last two bars are average dE of all the calibration colors after converted to spectra using Matrix3.

From the graph provided in FIG. 6, it is clear that when the number of calibration colors (e.g. N=12) is far less than the number of color channels (N=16 in this example), if Method 1 is used, although the first measurement result raw1 can be trained to match the reference spectra, a different measurement raw2 with slightly different noise from raw1 will end up with significant error. Thus, while the single matrix approach (Approach 1) is able to recover spectrum information, the approach is sensitive to noise induced errors. In contrast, where Approach 2 is employed, the dual-matrix trained system is able to accommodate noise much better. In fact, Approach 2 is more successful at accommodating noise than the average matrix approach (Approach 3).

Thus, when the number of calibration colors increases, the same improvement of Approach 2 over Approach 1 and Approach 3 can still be observed, but the difference between the approaches becomes smaller. For example, as shown in the graph of FIG. 6, where N=30 or N=42, the differences in the performance between the different approaches is more uniform. As a result, the dual matrix approach (Approach 2) improves upon the technical field by providing a more robust means of evaluating measurement data and obtaining spectrum data using a smaller set of training colors. As shown in FIG. 6, Approach 2 can improve the spectrum-recovery performance compared to both single matrix using single measurement (Approach 1) and single matrix using average of two measurements (Approach 3), especially when the number of calibration colors is smaller than or close to the number of color channels of the measurement system.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A color measurement system comprising:
   at least one illuminant configured to produce a light beam having one or more spectral power distributions (SPD) at a sample;
   a color measurement device configured to generate data in response to light from the at least one illuminant and reflected off the sample being incident on a light sensing portion of the color measurement device; and
   a processor having a memory and configured to receive the output signal from the color measurement device, and calculate a recovered reflectance spectrum of the sample using at least the output signal generated when the sample is illuminated by the at least one illuminant, wherein the recovered reflectance spectrum is calculated by generating a sample matrix using the data output from the color measurement device upon illumination of the sample, and obtaining the product of the sample matrix and a calibration value, wherein the calibration value is a matrix calculated using at least a matrix of concatenated calibration matrices and at least a matrix of concatenated master calibration matrices, wherein the concatenated calibration matrices includes a first calibration matrix of measurement values for a plurality of reference objects obtained under at least one measurement criterion and at least one additional calibration matrix of measurement values for the plurality of reference objects obtained under the same at least one measurement criterion.

2. The system of claim 1, wherein the at least one measurement criterion used to capture the first calibration matrix of measurement value includes at least one of: sample orientation, sample placement, number of illuminants, type of illuminants, and sample capture geometry.

3. The system of claim 2, wherein the first calibration matrix includes a plurality of measurements made under one or more illuminants.

4. The system of claim 3, wherein the sample matrix includes a plurality of measurements made under the same illuminants as the first calibration matrix.

5. The apparatus of claim 2, wherein the concatenated matrices are represented by S where $$S = \begin{pmatrix} s_{1,1} & \cdots & s_{1,n} \\ \vdots & \ddots & \vdots \\ s_{m,1} & \cdots & s_{m,n} \\ x_{1,1} & \cdots & x_{1,n} \\ \vdots & \ddots & \vdots \\ x_{m,1} & \cdots & x_{m,n} \end{pmatrix}$$

where $s_{m,n}$ are measurement values of the first calibration matrix and $x_{m,n}$ are the measurement values obtained in the at least one additional calibration matrix, and wherein m corresponds to a given reference object and n refers to the channel.

6. The apparatus of claim 5, wherein the measurement values for $s_{m,n}$ are obtained under at least one illuminant.

7. The apparatus of claim 1, wherein the reflectance spectrum r of the sample is calculated according to:

$$r = s * \left( pinv \begin{pmatrix} SBCRA1 \\ \cdots \\ SBCRAn \end{pmatrix} * \begin{pmatrix} R \\ \cdots \\ R \end{pmatrix} \right)$$

where, SBCRA1-SBCRAn each corresponds to a calibration matrix of measurements made of a plurality of calibration standards under the same at least one measurement criterion and each R is the same master calibration matrix of the plurality calibration standards obtained using a master measurement device.

8. The apparatus of claim 1, wherein the reflectance spectrum r of the sample is calculated according to:

$$r = s * \left( pinv \begin{pmatrix} SBCRA1 \\ \cdots \\ SBCRAn \end{pmatrix} * \begin{pmatrix} R_1 \\ \cdots \\ R_n \end{pmatrix} \right)$$

where, SBCRA1-SBCRAn each corresponds to a calibration matrix of measurements made of a plurality of calibration standards under the same at least one measurement criterion and $R_1$-Rn each corresponds to a measurement matrix of measurements made of the plurality of calibration standards obtained using the master measurement device under the same measurement conditions.

9. The apparatus of claim 7, wherein the master measurement device has more wavelength channels than the light sensing portion of the color measurement device.

10. The apparatus of claim 9, wherein the master calibration matrix was obtained from a measurement device having a number of wavelength channels that is less than or equal to about 31 spectral channels.

11. The apparatus of claim 1, further comprising a display device to display the calculated reflectance spectrum of the sample.

12. The apparatus of claim 1, wherein the generating step further includes the step of accessing from a memory, the master calibration matric.

13. The apparatus of claim 1, wherein the generating step further includes the step of accessing from a memory, the calibration value.

14. A method for identifying the color properties of a sample, the method comprising:

capturing, using a sample color sensing device, a sample measurement value of a sample illuminated by at least one illuminant;

generating, using at least one processor having memory and configured to execute code, a recovered color value for the sample using at least the sample measurement value and a calibration value, wherein the calibration value is a matrix derived using at least a matrix of concatenated calibration matrices and a matrix of concatenated master calibration matrices, wherein each of the matrix of concatenated calibration matrices includes a first measurement matrix of measurements of a plurality of reference tiles under at least one illuminant and at least one additional measurement matrix of measurements of the plurality of reference tiles under the at least one illuminant used to obtain the first measurement matrix; and outputting at least the calculated color properties.

15. The method of claim 14, wherein the recovered color value for the sample is calculated according to:

$R_{calculated} = T*M$ where T is a sample measurement matrix of the sample measurements obtained and M is the calibration matrix.

16. The method of claim 14, wherein the concatenated matrix S is generated according to:

$$S = \begin{pmatrix} s_{1,1} & \cdots & s_{1,n} \\ \vdots & \ddots & \vdots \\ s_{m,1} & \cdots & s_{m,n} \\ x_{1,1} & \cdots & x_{1,n} \\ \vdots & \ddots & \vdots \\ x_{m,1} & \cdots & x_{m,n} \end{pmatrix}$$

where $s_{m,n}$ and $x_{m,n}$ are both the measurement values from the same sample m at the same channel n.

17. The method of claim 16, wherein the concatenated matrices are obtained by capturing, using a calibration color sensing device having the same number of wavelength channels as the sample color sensing device, the measurement values for the first measurement matrix under at least one illuminant, and capturing at least the measurement values of the at least one additional measurement matrix under the same at least one illuminant used to capture the measurement values for the first measurement matrix.

18. The method of claim 14, wherein the calibration value M is derived according to:

$$M = pinv\begin{pmatrix} SBCRA1 \\ SBCRA2 \\ \ldots \\ SBCRAn \end{pmatrix} * \begin{pmatrix} R \\ R \\ \ldots \\ R \end{pmatrix}.$$

where, SBCRA1-SBCRAn are measurement matrices of a plurality of calibration standards obtained under the same measurement conditions and each R is the same measurement matrix of the plurality calibration standards obtained using a master measurement device.

19. The method of claim 14, wherein generating the recovered color value further comprises accessing the master calibration value from a memory remote to the processor.

* * * * *